United States Patent Office 3,373,111
Patented Mar. 12, 1968

3,373,111
REACTION PRODUCTS OF AN ORGANIC EPOXIDE AND AN ACYLATED POLYAMINE
William M. Le Suer, Cleveland, and Clark O. Miller, Willoughby, Ohio, assignors to The Lubrizol Corporation, Wickliffe, Ohio, a corporation of Ohio
No Drawing. Filed Oct. 14, 1963, Ser. No. 321,385
19 Claims. (Cl. 252—51.5)

This invention relates to oil-soluble nitrogen-containing compositions and to the process of preparing the same. The compositions of this invention are useful as additives in hydrocarbon oil and especially in lubricating compositions for internal combustion engines such as two-cycle (i.e., two-stroke) spark ignition engines, and fuels such as gasolines, burner fuel oils, etc.

The lubrication of a two-cycle internal combustion engine is provided by an oil-fuel mixture. Under these circumstances, the combustion characteristics of the oil are as important as its lubricating characteristics in maintaining proper performance of the engine. While mineral lubricating oils provide a desirable and economical source of the oil for use in such engines, they are, unfortunately, characterized by a tendency to form harmful products of combustion. Such products eventually agglomerate to form deposits in the engine and are a principal cause of not only excessive engine wear but also other difficulties such as spark plug fouling, piston ring sticking, rust formation, etc. Hence, in recent years a great deal of effort has been devoted to the improvement of the combustion characteristics of lubricating oils for use in two-cycle engines.

Accordingly, it is a principal object of this invention to provide a process for preparing novel compositions of matter.

It is another object of this invention to provide additives for use in lubricating compositions, especially lubricating compositions for use in two-cycle engines.

It is another object of this invention to provide additives useful in hydrocarbon oils.

It is another object of this invention to provide lubricating compositions.

It is another object of this invention to provide concentrates containing additives for use in hydrocarbon oils.

It is further an object of this invention to provide novel compositions of matter useful in fuel-oil mixtures.

These and other objects are attained in accordance with this invention by providing a process for preparing oil-soluble, nitrogen-containing compositions which comprises treating an acylated amine with at least 0.2 equivalent of an organic epoxide at a temperature within the range from about 50° C. to the decomposition temperature, said acylated amine being prepared by reacting at a temperature above about 80° C., an alkylene amine with from about 0.2 to 2 equivalents of an acid-producing compound selected from the class consisting of (A) substituted succinic acids having the structural formula

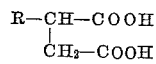

wherein R is a hydrocarbon radical having at least about 50 aliphatic carbon atoms.

(B) monocarboxylic acids having the structural formula

R′COOH wherein R′ is a branched-chain, hydrocarbon radical having from about 12 to about 50 aliphatic carbon atoms in the principal chain and at least 1 aliphatic substituted aryl pendent group, (C) mixtures of succinic acids of (A) and monocarboxylic acids selected from the class consisting of the monocarboxylic acids of (B) and aliphatic monocarboxylic acids having from about 12 to about 50 carbon atoms, and
(D) the esters and anhydrides of said acids.

The above process for preparing the acylated amine can be carried out simply by mixing the reactants or alternatively by adding one reactant to the other at a temperature above 80° C. The presence of a solvent is often advantageous because it facilitates mixing, temperature control, and the removal of the water found in the reaction. The solvent may be a hydrocarbon or an inert polar solvent. Examples of such solvents include benzene, toluene, xylene, naphtha, mineral oil, n-hexane, cyclohexane, dodecane, chlorobenzene, ether, chloroform, and carbon tetrachloride.

The process of this invention comprises essentially the preparation of an acylated amine which is then treated with an organic epoxide. The precise composition of the product is not known. However, it appears from the chemical analyses that the organic epoxide reacts with the hydrogen atoms which are attached to the nitrogen atoms in the acylated amine to form a hydroxy alkyl radical attached to the nitrogen atom by means of a nitrogen to carbon bond.

The term "alkylene amine" is used herein in a generic sense to denote a class of polyamines conforming for the most part to the structure

wherein $x$ is an integer preferably less than about 6 and the alkylene radical is preferably a lower alkylene radical such as ethylene, propylene, trimethylene, tetramethylene, or the like. Thus, it includes, for example, ethylene diamine, diethylene triamine, triethylene tetramine, tetraethylene pentamine, trimethylene diamine, propylene diamine, tetramethylene diamine, butylene diamine, N-aminoethyl trimethylene diamine, N-dodecyl propylene diamine, di-(trimethylene)triamine, pentaethylene hexamine, etc. It includes also higher and cyclic homologues such as piperazine. The ethylene amines are specially useful. These are discussed in some detail under the heading "Ethylene Amines" in "Encyclopedia of Chemical Technology" Kirk and Othmer, volume 5, pages 898–905, Interscience Publishers, New York (1950). Such compounds are prepared most conveniently by the reaction of an alkylene dihalide, e.g., ethylene dichloride, with ammonia or a primary amine. This reaction results in the production of somewhat complex mixtures of alkylene amines including cyclic condensation products such as piperazine, N-aminoethyl-piperazine, etc. These mixtures find use in the process of this invention. On the other hand, quite satisfactory products may be obtained also by the use of pure alkylene amines. An especially useful alkylene amine, for reasons of economy as well as effectiveness of the products derived therefrom, is a mixture of ethylene amines prepared by the reaction of ethylene chloride and ammonia having a composition corresponding to that of tetraethylene pentamine.

The acylated amine intermediate of this invention is prepared as mentioned previously by reacting an alkylene amine with an acid-producing compound. The acid producing compound may be:

(A) a substituted succinic acid in which the substituent is a hydrocarbon radical having at least about 50 aliphatic carbon atoms,
(B) monocarboxylic acids having the structural formula

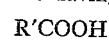

wherein R′ is a branched-chain, hydrocarbon radical having from about 12 to 50 aliphatic carbon atoms in the principal chain and at least 1 aliphatic substituted aryl pendent group, (C) mixture of the succinic esters of (A) and monocarboxylic acids selected from the class consisting of the monocarboxylic acids of (B) and aliphatic monocarboxylic acids having from 12 to 50 carbon atoms, and (D) the esters and anhydrides of said acids.

ACID PRODUCING COMPOUND A

The substituted succinic acids and the anhydrides and esters thereof are characterized by the presence in their structure of a substantially hydrocarbon substituent having at least about 50 aliphatic carbon atoms. The substantially hydrocarbon substituent of the succinic acid-producing compound may contain polar groups provided, however, that the polar groups are not present in proportions sufficiently large to alter significantly the hydrocarbon character of the substituent. The polar groups are exemplified by chloro, bromo, keto, ethereal, aldehydo, and nitro, etc. The upper limit with respect to the proportion of such polar groups in the substituent is approximately 10% based on the weight of the hydrocarbon portion of the substituent.

The sources of the substantially hydrocarbon substituent include principally the high molecular weight substantially saturated petroleum fractions and substantially saturated olefin polymers, particularly polymers of mono-olefins having from 2 to 30 carbon atoms. The especially useful polymers are the polymers of 1-mono-olefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. They are illustrated by 2-butene, 3-pentene, and 4-octene.

Also useful are the interpolymers of the olefins such as those illustrated above with other interpolymerizable olefinic substances such as aromatic olefins, cyclic olefins, and polyolefins. Such interpolymers include, for example, those prepared by polymerizing isobutene with styrene; isobutene with butadiene; propene with isoprene; ethylene with piperylene; isobutene with chloroprene; isobutene with p-methyl styrene; 1-hexene with 1,3-hexadiene; 1-octene with 1-hexene; 1-heptene with 1-pentene; 3-methyl-1-butene with 1-octene; 3,3-dimethyl-1-pentene with 1-hexene; isobutene with styrene and piperylene; etc.

The relative proportions of the mono-olefins to the other monomers in the interpolymers influence the stability and oil solubility of the final products derived from such interpolymers. Thus, for reasons of oil solubility and stability, the interpolymers contemplated for use in this invention should be substantially aliphatic and substantially saturated, i.e., they should contain at least about 80%, preferably at least about 95%, on a weight basis of units derived from the aliphatic mono-olefins and no more than 5% of olefinic linkages based on the total number of carbon-to-carbon covalent linkages. In most instances, the percentage of olefinic linkages should be less than about 2% of the total number of carbon-to-carbon covalent linkages.

Specific examples of such interpolymers include copolymer of 95% (by weight) of isobutene with 5% of styrene; terpolymer of 98% of isobutene with 1% of piperylene and 1% of chloroprene; terpolymer of 95% of isobutene with 2% of 1-butene and 3% of 1-hexene; terpolymer of 80% of isobutene with 10% of 1-pentene and 10% of 1-octene; copolymer of 80% of 1-hexene and 20% of 1-heptene; terpolymer of 90% of isobutene with 2% of cyclohexene and 8% of propene; and copolymer of 80% of ethylene and 20% of propene.

Another source of the substantially hydrocarbon radical comprises saturated aliphatic hydrocarbons such as highly refined high molecular weight white oils or synthetic alkanes such as are obtained by hydrogenation of high molecular weight olefin polymers illustrated above or high molecular weight olefinic substances.

The use of olefin polymers having molecular weights of about 250-5000 is preferred. Higher molecular weight olefin polymers having molecular weights from about 10,000 to about 100,000 or higher have been found to impart also viscosity index improving properties to the final products of this invention. The use of such higher molecular weight olefin polymers often is desirable. In most instances, polymers having molecular weights from about 450 to 3000 are most effective.

Acid producing Compound B

As mentioned previously, the acid-producing compound may be a monocarboxylic acid having the structural formula

R'COOH wherein R' is a branched-chain, hydrocarbon radical having from about 12 to about 50 aliphatic carbon atoms in the principal chain and at least 1 aliphatic substituted aryl pendent group. The critical aspect of the acylated amine intermediate obtained by the reaction of an alkylene amine with these monocarboxylic acids resides in the structure of the R' radical of the monocarboxylic acid-producing reactant. This radical should contain, first, a principal chain having from about 12 to 50 saturated, aliphatic carbon atoms and, second, at least one pendent group which is an aliphatic substituted aryl radical. The criticality is associated with the oil solubility and peculiar effectiveness of the nitrogen-containing compositions characterized by such an R' radical in the applications contemplated by this invention.

The principal chain of the R' radical is exemplified by a radical derived from tetradecane, pentadecane, hexadecane, heptadecane, octadecane, and eicosane. The pendent group is illustrated by tolyl, xylyl, n-isopropylphenyl, p-dodecylphenyl, o,p-diheptylphenyl, alpha - hexyl - beta-naphthyl, o-methoxyphenyl, 2,4,6-trimethylphenyl, or n-hexylphenyl radical. Specific examples of the aromatically substituted aliphatic acids include 9-tolyl-octadecanoic acid, 10-(o,p-di-tert-butylphenyl)-octadecanoic acid, 10-xylyl-octadecanoic acid, 9-(alpha-heptyl-beta-naphthyl)-octadecanoic acid, 8-tolyl-eicosanoic acid, and 12-(2,4,6-trimethylphenyl)-heptadecanoic acid.

A convenient method for preparing such acids involves the reaction of an aromatic compound with an unsaturated acid in the presence of a Friedel-Crafts catalyst such as alumnium chloride, ferric chloride, zinc chloride, sulfuric acid, phosphoric acid, boron trifluoride, or the like. The reaction may be carried out at a temperature between room temperature and 150° C. or even higher and in general is effected simply by mixing the reactants for a sufficient period and recovering the desired product by freeing it from the catalyst. To illustrate xylyl-stearic acid (most likely a mixture of 9- and 10-xylyl-octadecanoic acids) can be prepared by the reaction of oleic acid and xylene in the presence of aluminum chloride as the catalyst.

The anhydrides and the esters of the branched chain acids illustrated above likewise are useful for the preparation of the nitrogen-containing compositions of this invention. The anhydrides may be obtained, for instance, by the reaction of a halide of such an acid with an alkali metal salt of such an acid at a relatively high temperature. The esters useful herein include principally those derived from relatively low boiling alcohols such as methanol, ethanol, isopropanol, n-butanol, n-pentanol, and other alcohols boiling below about 120° C. In some instances, an aromatic ester such as the phenyl ester of the acid likewise may be used. The preparation of the esters can be effected by direct esterification of the acid with the alcohol or by the reaction of the acid halide with an alkali metal alcoholate. The reaction conditions employed for preparing the anhydrides and the esters by these and other methods are known in the art.

ACID PRODUCING COMPOUND C

The acid producing compound useful in the process of this invention may be a mixture of the succinic acids of (A) and monocarboxylic acids selected from the class consisting of the monocarboxylic acids of (B), aliphatic monocarboxylic acids having from about 12 to about 50 carbon atoms, and the esters and anhydrides of said acids. For the purpose of this invention when mixtures of succinic acids and monocarboxylic acids are used as the acid-producing reactant, the nature of the R' radical is not critical. Thus, a mixture of a succinic acid and an aliphatic monocarboxylic acid having from about 12 to about 50 carbon atoms may be reacted with an alkylene amine to produce a satisfactory acylated amine intermediate.

The aliphatic monocarboxylic acids contemplated for use in the process of this invention include the saturated and unsaturated acids. Examples of the useful acids are palmitic acid, decanoic acid, oleic acid, stearic acid, linoleic acid, linolenic acid, naphthenic acid, tall oil acid, etc. Stearic acid and oleic acid are especially useful.

The anhydrides and the esters of these aliphatic monocarboxylic acids are likewise useful for the preparation of the acylated amine intermediate of this invention. The esters useful herein include principally those derived from relatively low boiling alcohols such as methanol, ethanol, isopropanol, n-butanol, n-pentanol, and other alcohols boiling below about 120° C. In some instances, an aromatic ester such as the phenyl ester of the acid likewise may be useful. The preparation of the esters can be effected by direct esterification of the acid with the alcohol by reaction of the acid halide with an alkali metal alcoholate. The reaction conditions employed for the preparation of the anhydrides and esters by these and other methods are well known in the art.

The first step of the process of this invention comprises essentially the acylation of the alkylene amine with all of the acid radicals of the acid-producing compound. The acylation is accompanied by the formation of approximately 1 mole of water for each equivalent of the acid radical used. The product resulting from this process is substantially non-acidic. The precise composition of the product is not known. It appears that the product comprises predominantly of amides and imides, and may contain cyclic or polyamide linkages. Also a small amount of the amine carboxylate salts, imidazolines, and polyamidines may be formed in the preparation of the acylated amine, but these do not amount to an appreciable proportion of the products. The precise relative proportions of such radicals in the product usually are not known as they depend to a large measure upon the type of the acid-producing group and the nitrogen-containing radical involved in the reaction and also upon the environment (e.g., temperature) in which the reaction is carried out. To illustrate, the reaction involving an acid or anhydride group with an amino nitrogen-containing radical at relatively low temperatures such as below about 60° C. results predominantly in a salt linkage (i.e.,

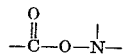

but at relatively high temperatures such as above about 80° C. results predominantly in an amide, imide, or amidine linkage (i.e.,

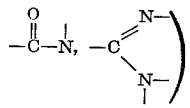

In any event, however, the products obtained by the above process, irrespective of the nature or relative proportions of the linkages present therein, have been found to be effective as intermediates in the process of this invention.

The relative proportions of the reactants to be used in the first step of this invention are such that for each equivalent of the alkylene amine used, there is employed from about 0.2 to 2 equivalents of the acid-producing compound. Generally, where acid-producing compound (C) is used, the ratio of equivalents of the hydrocarbon-substituted succinic acid and the monocarboxylic acid is within the range from about 1:0.1 to about 1:1 although greater amounts of either acid-producing reactant may be used. It will be noted that the equivalent weight of the alkylene amine is based upon its nitrogen content and that the equivalent weight of the acid reactant is based upon the number of acid radicals in the molecule. Thus, one mole of alkylene amine has as many equivalents as there are nitrogen atoms in the molecule, one mole of the succinic acid or anhydride has two equivalents and one mole of the monocarboxylic acid has one equivalent. The above limits with respect to the relative proportions of reactant are predicated upon the stoichiometry of the reaction involved in the process and also the utility of the product for the purposes of this invention. For example, the use of more than 2 equivalents of the acidic mixture for one equivalent of the alkylene amine used results in products having excessive acidity and corrosive tendencies. On the other hand, the use of lesser amounts of the acidic mixture limited by a minium of 0.2 equivalent for each equivalent of the alkylene amine used results in product having unreacted free amino-nitrogen atoms. Such products have been found to be useful and are, therefore, contemplated within the scope of this invention. Again based upon the consideration of utility, the preferred amount of the acidic mixture to be used in the first step of the process of this invention is one equivalent for each equivalent of the alkylene amine used and the preferred ratio of equivalents of the hydrocarbon-substituted succinic acid and a monocarboxylic acid in the acidic mixture (C) are within the range from about 1:0.25 to 1:0.5.

The oil-soluble, nitrogen-containing compositions of this invention are prepared by reacting the above prepared acylated amines with at least 0.2 equivalents of an organic oxide at a temperature within the range from about 50° C. to the decomposition temperature of the mixture. Generally, from 0.2 to 10 equivalents of the organic epoxide is reacted with the acylated amine at a temperature of from 100° C. to 200° C. Where the reaction is exothermic, the exothermic nature of the reaction usually is such that the temperature of the reaction can be controlled within this range without the application of any external heating. This may be accomplished by adding the organic apoxide to the acylated amine and varying the rate of addition to control the temperature.

The organic epoxide may be represented as having the structural formula

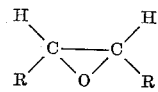

wherein R may be hydrogen or an aliphatic, cycloaliphatic, or aromatic radical having from 1 to 30 carbon atoms. More specifically, R may be an alkyl, haloalkyl, aryl, or haloaryl radical having no more than 1 halogen radical for every three carbon atoms. The lower alkylene and haloalkylene epoxides, including cycloalkylene epoxides, are especially preferred, i.e., those having from 1 to 8 carbon atoms in the alkylene radical. The preferred arylene and haloarylene epoxides are those containing from 1 to 2 resonant ring structures such as phenyl, naphthyl, and the substitution products of these such as the alkylation products and halogenation products. Examples of the alkylation products include tolyl, cresyl, xylyl, and methyl naphthyl. The arylene and haloarylene radicals containing but one resonant structure are preferred. These epoxides in which one of the carbon atoms attached to the O is attached also to two hydrogen atoms are especially preferred. These have been given the name terminal epoxides because they may be thought of as being derived from a vinyl compound or one which has a terminal olefinic double bond. Specific examples of the epoxides which are useful in the process of this invention include ethylene oxide, propylene oxide, 1,2-epoxy butane, 1,2-epoxy-3-butene, 1,2-epoxy pentane, 1,2-epoxy heptane, 1,2-dodecane, 2,3-epoxybutane, 1,2-epoxy-5-hexene, 1,2-epoxy cyclohexane, 2,3-epoxy heptane, epichlorohydrin, 1,2-epoxy-4-chlorobutane, styrene oxide, paramethyl styrene oxide, and para-chlorostyrene oxide.

The following examples illustrate the preparation of the oil-soluble, nitrogen-containing compositions of this invention: (Parts are by weight unless otherwise specified.)

Example 1

To a mixture of 2960 parts (10 moles) of methyl oleate and 4240 parts (40 moles) of xylene, there are added at 25°–95° C., 1466 parts (11 moles) of aluminum chloride throughout a period of 1 hour. The reaction mixture is heated at 80°–90° C. for 2 hours and then poured into cold water to free the product from the aluminum choride catalyst. The organic layer is washed with a dilute aqueous hydrochloric acid and then with water. It is then dried, heated to 140° C./20 mm. and filtered. The filtrate is a methyl ester of xylyl stearic acid having a saponification number of 137 (theory, 139).

A mixture of 2950 parts (7.2 equivalents) of the methyl ester of xylyl stearic acid and 544 parts (13 equivalents) of tetraethylene pentamine is heated to 210° C. for 2 hours and then at 210°–250° C. for 2.5 hours while nitrogen is bubbled through the reaction mixture. A mixture of methanol and water is collected as the distillate and the residue is heated to 180° C/30 mm. The residue is an acylated amine (3205 parts) having a nitrogen content of 5.8% (theory, 6.4%).

The above prepared acylated amine is heated to 150° C. and 430 parts (7.2 equivalents) of propylene oxide are added under the surface of the liquid over a period of 3.5 hours. The mixture is heated an additional 2 hours at this temperature and then at 100°–120° C./20 mm. for 0.5 hour to remove the volatile materials. The mixture is filtered and the filtrate is the desired product.

Example 2

A polyisobutenyl succinic anhydride is prepared by the reaction of a chlorinated polyisobutene with maleic anhydride at 200° C. The polyisobutenyl radical has an average molecular weight of 850 and the resulting alkenyl succinic anhydride is found to have an acid number of 101 (corresponding to an equivalent weight of 555). To a mixture of 5000 parts (9 equivalents) of this polyisobutenyl succinic anhydride and 3650 parts of mineral oil there are added at 60° C. over a period of 1.5 hours, 553 parts (13.5 equivalents) of a commercial ethylene amine mixture having an average composition corresponding to that of tetraethylene pentamine. The mixture is then heated at 150°–155° C. for 6 hours while blowing with nitrogen to remove the water. The residue is a 60% mineral oil solution of the desired acylated amine having a nitrogen content of 2.10% (theory, 2.08%).

To 850 parts (0.5 equivalent) of this acylated amine solution there are added at 70° C. 46 parts (0.5 equivalent) of epichlorohydrin. The mixture is heated at 150°–155° C. for 4 hours and at 140° C./20 mm. for 1 hour. The residue is the product having the following analyses: percent nitrogen, 1.94 (theory, 1.92%); percent chlorine, 1.89 (theory, 1.83%).

Example 3

To a mixture of 1000 parts (1.8 equivalents) of a polyisobutenyl succinic anhydride prepared as in Example 2 and 200 parts of mineral oil, there are added at 65°–95° C., 80 parts (1.8 equivalents) of an ethylene amine mixture having an average composition corresponding to that of tetraethylene pentamine. This mixture is heated to 150° C. to remove all of the water formed in the reaction. Nitrogen is bubbled through the mixture at this temperature to insure removal of the last traces of water. The residue is diluted by adding 588 parts of mineral oil.

To 1000 parts of this acylated amine solution there are added 5.3 parts of sodium methoxide catalyst and 53 parts of propylene oxide. The mixture is heated at 180°–195° C. for 7 hours during which time any evolved propylene oxide is returned by way of a Dry Ice-acetone cold-finger. The volatile components are then removed by heating to 180° C./3 mm. A filter aid is added and the mixture is filtered. The filtrate is the desired product (39.2% mineral oil) having a nitrogen content of 1.55% (theory, 1.50%) and a hydroxyl content of 0.8% (theory, 0.6%).

Example 4

A polyisobutenyl-substituted succinic acid is prepared by hydrolysis of the corresponding anhydride (prepared in turn by the condensation of a chlorinated polyisobutene and maleic anhydride). To 1152 parts (1.5 equivalents) of a 70% mineral oil solution of this polyisobutenyl succinic acid having an acid number of 62 there are added at room temperature 90 parts (3 equivalents) of ethylene diamine. The mixture is heated at 150°–157° C. for 7 hours during which time water is removed. The residue is then filtered and the filtrate is the desired acylated amine which is treated with an equivalent amount of propylene oxide at 150° C. over a period of 2 hours. The mixture is then blown with nitrogen at this temperature for 2 hours. The residue is the desired product.

Example 5

A mixture of 555 parts (1 equivalent) of the polyisobutenyl succinic anhydride prepared as in Example 2 and 508 parts of mineral oil is heated to 85°–90° C., and 172 parts (4.5 equivalents) of diethylene triamine are added. The mixture is heated to 200° C., blown with nitrogen for 3 hours, and filtered while hot. The filtrate is the desired acylated amine which is cooled to 150° C. and treated with an equivalent amount of ethylene oxide at this temperature. The mixture is filtered and the filtrate is the desired product.

Example 6

A mixture of 122 parts (3.2 equivalents) of tetraethylene pentamine and 593 parts of mineral oil is heated to 50° C., and a warm mixture of 114 parts (0.4 equivalent) of stearic acid and 692 parts (1.3 equivalents) of a polyisobutenyl succinic anhydride prepared as in Example 2 is added to the amine. The mixture is then heated to 210–220° C. and held at this temperature for 3 hours while blowing with nitrogen. The residue is the desired acylated amine having a nitrogen content of 2.80% (theory, 2.33%) and a base number of 43.7.

A mixture of this acylated amine (400 parts, 0.312 equivalent) and 30 parts (0.52 equivalent) of propylene oxide is heated at 65°–70° C. for 6.5 hours. Any propylene oxide which vaporizes is condensed and returned to the reaction mixture. The mixture is then heated at 90° C./15 mm. to remove the remaining volatile materials. The residue is the desired product having the following analyses: percent nitrogen, 2.76 (theory, 2.9); base number, 48.

Example 7

A mixture of 555 parts (1 equivalent) of the polyisobutenyl succinic anhydride prepared as in Example 2 and 560 parts of mineral oil is heated to 85° C. and 256 parts (1 equivalent) of palmitic acid is added. To this mixture there is added, over a period of 2 hours, 215 parts (5 equivalents) of a commercial mixture of alkylene amines having an overall composition corresponding to that of tetraethylene pentamine and the mixture is heated at 200° C. while blowing with nitrogen for a period of 5 hours. The residue is cooled to 150° C. and 70 parts (1.2 equivalents) of propylene oxide is added while maintaining the reaction temperature at 150°–160° C. The mixture is then blown with nitrogen for 1 hour at this temperature whereupon a filter aid is added and the mixture filtered while hot. The filtrate is the desired product (40% mineral oil).

*Example 8*

A mixture of 457 parts (0.74 equivalent) of a polyisobutenyl succinic anhydride prepared as in Example 3, and 205 parts of mineral oil is heated to 110° C. whereupon 60 parts of 0.21 equivalent) of stearic acid is added and the mixture heated to 120° C. To this mixture there is added 186 parts of mineral oil and 78 parts of a commercial mixture of alkylene amines having an overall composition corresponding to that of tetraethylene pentamine. This mixture is heated to 200° C. and maintained at this temperature for 4 hours while blowing with nitrogen. The mixture is cooled to 150° C., 10 parts of a filter aid is added, and the mixture is filtered. The filtrate is the desired acylated amine (40% mineral oil) having a nitrogen content of 2.77% (theory, 2.9%) and a base number of 48.

Six hundred parts (0.46 equivalent) of this acylated amine solution is heated to 150° C. and 18 parts (0.31 equivalent) of propylene oxide is added under the surface of the liquid over a period of 2 hours. Any propylene oxide which vaporizes is condensed in a Dry Ice condenser and returned to the reaction mixture. The reaction mixture is heated at 150° C. for 0.5 hour after all of the propylene oxide is added, and then blown with nitrogen at this temperature for 1 hour. The residue is filtered and the filtrate is the desired product having the following analyses: percent nitrogen, 2.72% (theory, 2.77%); percent hydroxyl, 1.54%; base number, 38.5.

*Example 9*

A mixture of 66.3 parts (0.23 equivalent) of stearic acid, 202 parts (0.35 equivalent) of a polyisobutenyl succinic anhydride prepared as in Example 2 and 208 parts of mineral oil is heated to 85° C. whereupon 44.3 parts (1.17 equivalents) of tetraethylene pentamine is added. The mixture is heated at 210° C. for 3 hours while blowing with nitrogen. A filter aid is added and the mixture filtered while hot. The filtrate is the desired acylated amine (40% mineral oil) having a nitrogen content of 2.74% and a base number of 48.6.

A mixture of 400 parts (0.35 equivalent) of this acylated amine solution and 20.2 parts (0.35 equivalent) of propylene oxide is heated to 80° C. over a period of 6 hours and maintained at 80°–90° C. for 4 hours. The mixture is then heated at 105° C./12 mm. for 1 hour, and the residue is the product having a nitrogen content of 2.69% and a base number of 38.

*Example 10*

A mixture of 456 parts (0.81 equivalent) of a polyisobutenyl succinic anhydride prepared as in Example 2, 156 parts of mineral oil, and 39 parts (0.14 equivalent) of stearic acid is heated to 95° C. and maintained at this temperature for 15 minutes. This acidic mixture is added to a mixture of 78 parts of a commercial mixture of ethylene amines having an average composition corresponding to that of tetraethylene pentamine and 216 parts of mineral oil over a period of 35 minutes while maintaining the reaction temperature at 85°–105° C. The mixture is heated at 210° C. for 5 hours while blowing with nitrogen, cooled to 155° C., and treated with 22 parts (0.38 equivalent) of propylene oxide over a period of 1.8 hours at 150°–155° C. The reaction mixture is maintained at this temperature for 30 minutes and then blown with nitrogen for 1 hour at this temperature. A filter aid is added and the mixture is filtered. The filtrate is the desired product (39% mineral oil) having a nitrogen content of 2.63% (theory, 2.8%).

*Example 11*

The procedure of Example 10 is repeated except that 415 parts (0.74 equivalent) of the polyisobutenyl succinic anhydride and 60 parts (0.21 equivalent) of stearic acid is utilized. The product of this reaction has the following analyses: percent hydrogen, 2.71 (theory, 2.85); base number, 42.

*Example 12*

A mixture of 432 parts (0.77 equivalent) of a polyisobutenyl succinic anhydride prepared as in Example 2 and 202 parts of mineral oil is heated to 95° C. whereupon 62.5 parts (0.24 equivalent) of a eutectic mixture of palmitic and stearic acids is added over a period of 15 minutes. The reaction mixture is heated to 120° C. in 30 minutes and maintained at this temperature while blowing with nitrogen.

To a mixture of 184 parts of mineral oil and 77.5 parts (1.88 equivalents) of an ethylene amine mixture having an average composition corresponding to that of tetraethylene pentamine heated to 95° C., there is added 673 parts of the above prepared acid mixture over a period of 1.3 hours. The reaction mixture is maintained at a temperature of 95°–120° C. during the addition and then raised to 210° C. in 4 hours, and maintained at this temperature for an additional 5 hours while continuously blowing with nitrogen. Ten parts of a filter aid is added and the reaction mixture is filtered. The filtrate is the desired acylated amine having the following analyses: percent nitrogen, 2.78 (theory, 2.85); base number, 52.

Three hundred and sixty parts (0.28 equivalent) of the above prepared acylated amine are heated to 150° C. whereupon 16.2 parts (0.28 equivalent) of propylene oxide are added under the surface over a period of 1 hour. The mixture is maintained at this temperature for 4.5 hours and then at 90° C./20 mm. for 20 minutes. The residue is the product (40% mineral oil) having the following analyses: percent nitrogen, 2.60 (theory, 2.69); base number, 38.8.

*Example 13*

A polypropenyl succinic anhydride is prepared by the reaction of a chlorinated polypropene (having a molecular weight of about 900 and a chlorine content of 4%) and maleic anhydride at 200° C. The product has an acid number of 75 and an equivalent weight 750. A mixture of 200 parts of mineral oil and 68 parts (1.5 equivalents) of di-(1,2-propylene) triamine (having a nitrogen content of 31.3%) is heated to 90° C. whereupon an acidic mixture comprising 375 parts (0.5 equivalent) of the polypropenyl succinic anhydride prepared above and 70 parts (0.25 equivalent) of oleic acid in 140 parts of mineral oil is added to the amine over a period of 1 hour while maintaining a temperature between 95°–110° C. The reaction mixture is heated to 200° C. and maintained at this temperature for 5 hours while blowing with nitrogen. The residue is cooled to 150° C. whereupon an equivalent amount of ethylene oxide is added over a period of 2 hours. Any vaporized ethylene oxide is condensed on a cold finger and returned to the reaction mixture. The reaction mixture is blown with nitrogen for 1 hour and ten parts of a filter aid is added. The mixture is filtered and the filtrate is the desired product.

*Example 14*

The procedure of Example 4 is repeated except that the polyisobutenyl succinic acid is replaced on an equivalent basis by an acidic mixture composed of 3 equivalents of polyisobutenyl succinic anhydride and 2 equivalents of xylyl stearic acid, and 120 parts (4 equivalents) of ethylene diamine are used.

*Example 15*

A mixture of 336 parts (0.5 equivalent) of xylyl stearic acid and 280 parts (0.5 equivalent) of a polyisobutenyl succinic anhydride prepared as in Example 3 is added to a mixture of 365 parts of mineral oil and 82 parts (2 equivalents) of a commercial ethylene amine mixture having an average composition corresponding to that of tetraethylene pentamine at 50° C. and the reaction mixture is heated to 120° C. in 2 hours. The mixture is blown with nitrogen, heated to 200° C. in 1 hour, and maintained at this temperature for 2.5 hours. Ten parts of a filter aid are added and the mixture is filtered. The filtrate is the desired acylated amine having a nitrogen content of 2.93% (theory, 3.16%) and a base number of 50.2. This acylated amine is heated to 150° C. and treated with an equivalent amount of propylene oxide in the manner described in Example 2.

*Example 16*

An olefin polymer-substituted succinic anhydride is obtained by heating at 200°–220° C. 1.2 moles of maleic anhydride with 1 mole of a copolymer of 75 mole-percent of propylene and 25 mole-percent of ethylene having an average molecular weight of 10,000. To a solution of the above anhydride in an equal weight of mineral oil, there are added at 95° C., 164 parts (4 equivalents) of a commercial ethylene amine mixture having an average composition corresponding to that of tetraethylene pentamine, and the mixture is heated to 200° C. and blown with nitrogen for 2 hours at this temperature. After cooling the mixture to 150° C., the mixture is treated with an equivalent amount of ethylene oxide in the manner described in Example 13.

*Example 17*

A mixture of 55.5 parts (0.1 equivalent) of the polyisobutenyl succinic anhydride of Example 2, 60 parts of mineral oil, and 88.8 parts (0.3 equivalent) of methyl stearate is added to the mixture of 63 parts of mineral oil and 41 parts (1 equivalent) of a commercial ethylene amine mixture having an average composition corresponding to that of tetraethylene pentamine in 1 hour at a temperature of 90°–100° C. The mixture is then heated to 200° C. and blown with nitrogen for 5 hours whereupon the residue is cooled to 170° C. and treated with an equivalent amount of 1,2-butylene oxide. The volatile components are then removed by heating to 180° C./10 mm. A filter aid is added and the mixture is filtered. The filtrate is the desired product (40% mineral oil).

*Example 18*

To 500 parts (0.3 equivalent) of the acylated amine prepared in Example 2 there are added at 150° C., 65 parts (1.5 equivalents) of ethylene oxide below the surface of the reaction mixture. The mixture is heated at 135°–150° C. for 1 hour and at 100° C./20 mm. for an additional hour. The residue is the desired product.

*Example 19*

To 1950 parts of the acylated amine prepared in Example 3 containing 9.8 parts of sodium methoxide as catalyst, there are added 182 parts (5 equivalents) of ethylene oxide over a period of 6 hours at 180°–190° C. The mixture is then blown with nitrogen for 15 minutes at this temperature and filtered through a filter aid. The filtrate is the desired product (39% mineral oil) having a nitrogen content of 1.51% (theory, 1.51%) and a hydroxyl content of 0.82% (theory, 0.88%).

*Example 20*

An acylated amine is prepared according to the procedure of Example 3 by reacting 1000 parts (1.8 equivalents) of the polyisobutenyl succinic anhydride with 60 parts (1.35 equivalents) of the ethylene amine mixture. This acylated amine (700 parts) is heated to 145° C. in 2.5 hours, and propylene oxide is added to the mixture below the surface over a period of 2.5 hours at a rate of 10 pounds per hour. The mixture is stirred an additional hour at this temperature and then blown with nitrogen for 1 hour. Three parts of a filter aid are added and the mixture is filtered. The filtrate is the desired product having a nitrogen content of 1.08%.

*Example 21*

An acylated amine is prepared by heating at 210°–220° C. for 2 hours, a mixture of 378 parts (1 equivalent) of xylyl stearic acid and 68 parts (1.92 equivalents) of diethylene triamine. This acylated amine has a nitrogen content of 6.1% (theory, 6.9%). This acylated amine is then heated to 150° C. whereupon 180 parts (3 equivalents) of propylene oxide are added under the surface of the liquid over a period of 3 hours. After heating an additional 2 hours at this temperature, the mixture is heated at 100°–120° C./mm. for 0.5 hours to remove the volatile materials. The mixture is filtered and the filtrate is the desired product.

*Example 22*

The procedure of Example 6 is repeated except that the propylene oxide is replaced on an equivalent basis, with styrene oxide and the addition is affected at 200° C.

The oxidation resistance of lubricants containing the compositions of this invention is shown by the results, summarized in Table I below, of an air-oxidation test which consists of bubbling air at a rate of 1.25–1.3 cubic feet per hour into 350 grams of a lubricant sample having immersed therein an oxidation catalyst (consisting of 125 grams of iron, 120 grams of copper, and 31 grams of lead) at 302° ± 4° F. and measuring the viscosity change of the lubricant at regular intervals until a sharp increase in the viscosity occurs or haze or sediment develops. The viscosity change is expressed in terms of a percentage of SUS increase. It will be noted that a smaller increase in viscosity indicates a greater oxidation resistance of the lubricant and that the appearance of haze or sediment indicates formation of a significant quantity of oxidation product and, therefore, indicates the extent of oxidation resistance of the lubricant. For this test, a lubricant containing 4.25% by weight of a commercial, polymeric alkyl methacrylate viscosity index-improving agent and 0.05% (based on percent phosphorus) of zinc di-n-octyl phosphorodithioate is utilized.

TABLE I.—OXIDATION TEST

| Additive | Percent viscosity increase and/or sedimentation at end of (hours) (Duplicate) | | | | | | |
|---|---|---|---|---|---|---|---|
| | 64 | 72 | 88 | 96 | 112 | 120 | 136 |
| I. 2% of the product of Example 20 | 16.7 | 17.3 | 21.8 | 24.6 | 31.3 | 36.4 | 63.3 |
| | 20.7 | 21.8 | 25.7 | 29.1 | 31.3 | 38.6 | 54.9 |
| II. 2% of the intermediate acylated amine of Example 20 | 19.3 | 23.9 | 47.6 | 69.1 | (¹) | | |
| | 15.4 | 21.6 | 62.9 | (²) | | | |

¹ Sludge.
² Trace of sludge.

Treatment of the acylated amines with an organic epoxide results in the formation of a product with improved oil-solubility. This improvement is shown by the following extended solubility tests (Table II) which were carried out using an acylated amine and the corresponding propylene oxide treated acylated amine.

TABLE II.—OIL SOLUBILITY

| Oil Solution Containing | Time | Concentration (Percent by Weight) | | |
|---|---|---|---|---|
| | | 1 | 10 | 50 |
| The intermediate acylated amine of Example 8. | Initially | Soluble | Soluble | Soluble. |
| | 1 Week | ....do.... | ....do.... | Do. |
| | 1 Month | ....do.... | Insoluble | Insoluble. |
| The product of Example 8 | Initially | Soluble | Soluble | Soluble. |
| | 1 Week | ....do.... | ....do.... | Do. |
| | 1 Month | ....do.... | ....do.... | Do. |

The difference in oil solubility between the organic epoxide treated acylated amine and the corresponding acylated amines is believed to be related to the changes in viscosity storage. This may be illustrated by comparing the viscosity of the product of Example 10 with the correspondnig non-epoxide treated acylated amine product. The product of Example 10 undergoes a viscosity increase of only 9.5% in ten (10) months while the corresponding non-epoxide treated composition undergoes a viscosity increased of 11.8% in only eight (8) months.

The principal utility of the oil-soluble, nitrogen-containing compositions prepared by the process of this invention is as additives in the oil-fuel mixture for use in two-cycle internal combustion engines. In this application they are effective in reducing engine wear and minimizing the tendency of the oil-fuel mixture to cause spark plug fouling and to form harmful engine deposits. Their effectiveness is shown by the results (Table III) of a two-cycle engine test. In this test, a 60-horsepower, two-cycle, three-cylinder outboard motor is subjected to cycling operations, each cycle consisting of 55 minutes of full throttle operation (5500–5600 r.p.m.) and 5 minutes of idling (600–700 r.p.m.) under the following conditions: water inlet temperature, 78°82° F.; water outlet temperature, 140°–180° F.; and tank temperature, 95°–105° F. The oil-fuel mixture used in the test consists of 720 parts (by volume) of a regular leaded gasoline having an octane number of 93–94 and 18 parts (by volume) of an SAE 40 mineral lubricating oil containing the chemical additive. The effectiveness of the additive is measured in terms of the piston cleanliness on a scale of 0 to 10 (0 being indicative of extremely heavy deposits and 10 being indicative of no deposit). An additive should have a rating of at least 5 if it is to be commercially acceptable.

TABLE III

| Additive | Percent by Wt. | Test Period (hours) | Average Piston Rating |
|---|---|---|---|
| Composition of Example 8 | 6.7 | 50 | 9.0 |
| | | 100 | 8.3 |
| Composition of Example 10 | 6.0 | 75 | 8.2 |
| Composition of Example 11 | 6.7 | 100 | 7.5 |

The gasolines useful as the fuels for two-cycle engines may be of regular or premium grade having an octane number from about 80 to about 110. They may contain an anti-knock agent such as tetraethyl lead or tetramethyl lead and a scavenger such as ethylene dibromide or ethylene dichloride. In lieu of the gasoline, diesel fuel likewise is useful in two-cycle internal combustion engines. The lubricating base oils useful in the fuel-oil mixture for two-cycle engines are usually characterized by viscosity values from about 30 to about 200 SUS (Saybolt Universal Seconds) at 210° F. The most commonly used oils are the mineral lubricating oils having viscosity values from about 40 to about 120 SUS at 210° F. They are exemplified by mineral lubricating oils of SAE 10 to SAE 50 grades.

The relative proportions of the lubricating oil to the gasoline in the oil-fuel mixture may vary within wide ranges such as from a ratio of about 1:120 to a ratio of about 1:5, respectively, by volume. The preferred ratio is from about 1:10 to about 1:60, respectively, of the lubricating oil to the gasoline.

The oil-fuel mixtures for two-cycle engines may contain other additives such as metal-containing detergents, corrosion-inhibiting agents, oxidation-inhibiting agents, etc. The metal-containing detergents are exemplified by the alkaline earth metal salts of oil-soluble acids, e.g., mahogany sulfonic acid and didodecylbenzene sulfonic acid. The metal salts include both the normal salts and the basic salts, the latter describing the metal salts in which the metal is present in a stoichiometrically greater amount than the organic acid radical. Specific examples of the metal-containing detergents are calcium salt of mahogany sulfonic acid, strontium salt of mahogany sulfonic acid, basic barium salt of didodecylbenzene sulfonic acid obtained by carbonating a mixture of a mineral oil, a sulfonic acid and barium hydroxide (5 chemical equivalents per equivalent of the acid) in the presence of a promoting agent such as octylphenol (one equivalent per equivalent of the acid). Other metal-containing detergents include the alkaline earth metal salts of organic phosphorus acids prepared by the treatment of an olefin polymer (such as polyisobutene having a molecular weight of about 1000) with a phosphorus sulfide (such as phosphorus pentasulfide or phosphorus heptasulfide). These metal salts likewise may be normal or basic salts.

The corrosion-inhibiting agents and the oxidation-inhibiting agents are exemplified by phenolic compounds such as 2,6-dibutyl-4-methylphenol, 4,4'-methylene-bis(2-tert-butyl-6-isopropylphenol, 2-methyl-6-tert-butyl-4-heptylphenol, and sulfurized heptylphenol. Arylamines and sulfurized hydrocarbons likewise are useful as inhibiting agents. They include, for example, sulfurized dipentene (obtained by the reaction of two moles of dipentene with one mole of sulfur at 150° C.), the reaction product of turpentine (4 moles) with phosphorous pentasulfiide (1 mole), N,N'-dibutyl phenylenediamine, N-phenyl naphthylamine and dibutyl tetrasulfide.

The concentrations of the chemical additives in the oil-fuel mixtures depend to some extent upon the oils and fuels used and the types of service to which the oil-fuel mixtures are to be subjected. In most applications the nitrogen-containing composition of the invention is present in the oil-fuel mixture at concentrations ranging from 0.001% to about 2%, preferably from 0.01% to 3% by weight of the mixture. The concentration of the other additives may each range from 0.0001% to 2% by weight of the mixture.

The following examples illustrate further the fuel-oil mixtures containing the oil-soluble, nitrogen-containing compositions of this invention: (The relative proportions of the fuel and the lubricating oil are expressed in parts by volume whereas the concentration of the additives are expressed in percentages by weight of the oil-fuel mixture).

*Example A*

SAE 20 mineral lubricating oil _____parts__ 1
Gasoline having an octane number of 98 ___do____ 20
The product of Example 10 _____percent__ 0.15

Example B

| | | |
|---|---|---|
| SAE 30 mineral lubricating oil | parts | 1 |
| Gasoline having an octane number of 100 | do | 16 |
| The product of Example 11 | percent | 0.05 |

Example C

| | | |
|---|---|---|
| SAE 50 mineral lubricating oil | parts | 1 |
| Gasoline having an octane number of 85 | do | 30 |
| The product of Example 2 | percent | 0.1 |

Example D

| | | |
|---|---|---|
| SAE 40 mineral lubricating oil | parts | 1 |
| Gasoline having an octane number of 95 | do | 50 |
| The product of Example 10 | percent | 0.05 |
| 4,4'-methylene-bis(2,6-ditert-butylphenol) | do | 1 |

Example E

| | | |
|---|---|---|
| SAE 60 mineral lubricating oil | parts | 1 |
| Gasoline having an octane number of 99 | do | 20 |
| The product of Example 1 | percent | 0.025 |
| Barium salt of mahogany sulfonic acid | do | 0.01 |

What is claimed is:

1. Oil-soluble nitrogen-containing compositions prepared by reacting an acylated amine with at least 0.2 equivalent of an organic epoxide at a temperature within the range from about 50° C. to the decomposition temperature, said acylated amine being prepared by reacting at a temperature above about 80° C., an alkylene amine with from about 0.2 to 2 equivalents, per equivalent of alkylene amine, of an acid-producing compound selected from the class consisting of
   (A) substituted succinic acids having the structural formula

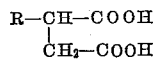

wherein R is a hydrocarbon radical having at least about 50 aliphatic carbon atoms,
   (B) monocarboxylic acids having the structural formula

R'COOH wherein R' is a branched-chain, hydrocarbon radical having from about 12 to about 50 aliphatic carbon atoms in the principal chain and at least 1 aliphatic substituted aryl pendant group,
   (C) mixtures of succinic acids of (A) and monocarboxylic acids selected from the class consisting of the monocarboxylic acids of (B) and aliphatic monocarboxylic acids having from about 12 to about 50 carbon atoms, and
   (D) the esters of alcohols boiling below about 120° C. and phenol.

2. Oil-soluble compositions according to claim 1 characterized further in that the alkylene amine is a polyethylene polyamine.

3. Oil-soluble compositions according to claim 1 characterized further in that the alkylene amine is an ethylene amine mixture having an average composition corresponding to that of tetraethylene pentamine.

4. Oil-soluble compositions according to claim 1 characterized further in that the acid-producing compound is a hydrocarbon-substituted succinic acid anhydride.

5. Oil-soluble compositions according to claim 4 characterized further in that the hydrocarbon-substituted succinic anhydride is an aliphatic-substituted succinic anhydride wherein the aliphatic radical is derived from an olefin polymer having a molecular weight above about 750.

6. Oil-soluble compositions according to claim 1 characterized further in that the organic epoxide is an aliphatic epoxide.

7. Oil-soluble, nitrogen-containing compositions prepared by reacting an acylated amine with at least 0.2 equivalent of an aliphatic epoxide at a temperature within the range from about 100° C. to the decomposition temperature, said acylated amine being prepared by reacting at a temperature above about 80° C., at least one ethylene amine containing up to an average of six amino nitrogen atoms with from about 0.2 to 2 equivalents per equivalent of ethyleneamine, of an acid-producing compound selected from the class consisting of
   (A) hydrocarbon-substituted succinic acid anhydrides having at least about 50 aliphatic carbon atoms in the hydrocarbon radical,
   (B) monocarboxylic acids having the structural formula

R'COOH

wherein R' is a branched-chain, hydrocarbon radical having from about 12 to about 50 aliphatic carbon atoms in the principal chain and at least one aliphatic substituted aryl pendant group,
   (C) mixtures of the succinic acids of (A) and monocarboxylic acids selected from the class consisting of the monocarboxylic acids of (B) and aliphatic monocarboxylic acids having from about 12 to about 50 carbon atoms, and
   (D) the esters of alcohols boiling below about 120° C. and phenol.

8. Oil-soluble compositions according to claim 7 characterized further in that the aliphatic epoxide is propylene oxide.

9. Oil-soluble compositions according to claim 7 characterized further in that the acid-producing compound is an acidic mixture of a hydrocarbon-instituted succinic anhydride and an aliphatic monocarboxylic acid, the ratio of equivalents of said succinic anhydrides to said monocarboxyl acid in the acidic mixture being from about 1:0.1 to about 1:1.

10. Oil-soluble compositions according to claim 9 characterized further in that the aliphatic monocarboxylic acid is stearic acid.

11. Oil-soluble compositions according to claim 9 characterized further in that the aliphatic epoxide is propylene oxide.

12. Oil-soluble, nitrogen-containing compositions which comprises treating at least one acylated amine with at least 0.3 equivalent of propylene oxide at a temperature within the range from about 100° C. to about 200° C., said acylated amine being prepared by reacting at a temperature above about 80° C., an ethylene amine mixture having an average composition corresponding to that of tetraethylene pentamine with 0.5 equivalent of an acidic mixture consisting of
   (A) a hydrocarbon-substituted succinic anydride having at least about 50 aliphatic carbon atoms in the hydrocarbon radical and
   (B) stearic acid,
the ratio of equivalent of said succinic anhydride to stearic acid in the mixture being from about 9:1 to 2:1.

13. Oil-soluble compositions according to claim 12 characterized further in that the ratio of succinic anhydride to stearic acid in the acid mixture is 6:1.

14. Oil-soluble compositions according to claim 12 characterized further in that the ratio of succinic anhydride to stearic acid in the acid mixture is 3.5:1.

15. A mineral oil composition containing a minor amount sufficient to impart anti-wear and anti-sludge properties thereto of an oil-soluble, nitrogen containing composition of claim 1.

16. A mineral oil composition containing a minor amount sufficient to impart anti-wear and anti-sludge properties thereto of an oil-soluble, nitrogen-containing composition of claim 12.

17. A fuel-oil mixture suitable for use in two-cycle engines comprising gasoline, a mineral lubricating oil, and a minor proportion sufficient to impart anti-wear and anti-sludge properties thereto of an oil-soluble, nitrogen-containing composition of claim 1.

18. A fuel-oil mixture suitable for use in two-cycle engines comprising gasoline, a mineral lubricating oil, and a minor proportion sufficient to impart anti-wear and anti-sludge properties thereto of an oil-soluble, nitrogen-containing composition of claim 12.

19. A mineral oil composition containing a minor amount sufficient to impart anti-wear and anti-sludge properties thereto of an oil-soluble, nitrogen-containing composition of claim 7.

References Cited

UNITED STATES PATENTS

| | | | |
|---|---|---|---|
| 2,854,323 | 9/1958 | Shen et al. | 44—71 |
| 3,240,575 | 3/1966 | Miller et al. | 44—71 |
| 3,251,853 | 5/1966 | Hoke | 44—66 |
| 3,259,578 | 7/1966 | Dickson et al. | 44—66 |
| 3,301,783 | 1/1967 | Dickson et al. | 252—51.5 X |

DANIEL E. WYMAN, *Primary Examiner.*

C. F. DEES, *Assistant Examiner.*

UNITED STATES PATENT OFFICE
CERTIFICATE OF CORRECTION

Patent No. 3,373,111    Dated March 12, 1968

Inventor(s)  William M. Le Suer et al.

It is certified that error appears in the above-identified patent and that said Letters Patent are hereby corrected as shown below:

Column 15, line 54 and column 16, line 27, "and phenol.", each occurrence, should read -- and phenol and anhydrides of said acids. --. Column 16, line 33, "hydrocarbon-instituted" should read -- hydrocarbon-substituted --; line 57, "equivalent" should read -- equivalents --.

Signed and sealed this 20th day of April 1971.

(SEAL)
Attest:

EDWARD M. FLETCHER, JR.
Attesting Officer

WILLIAM E. SCHUYLER, JR.
Commissioner of Patents